United States Patent [19]
Heffernan et al.

[11] Patent Number: 5,299,972
[45] Date of Patent: Apr. 5, 1994

[54] SYSTEM AND APPARATUS FOR PROCESSING CRAB SECTIONS

[75] Inventors: John T. Heffernan, Bellevue; James D. Orr, Everett, both of Wash.

[73] Assignee: Northwest Wire Works, Inc., Seattle, Wash.

[21] Appl. No.: 995,195

[22] Filed: Dec. 22, 1992

[51] Int. Cl.⁵ .............................................. A22C 29/00
[52] U.S. Cl. ................................... 452/1; 452/12; 206/508; 211/49.1; 211/181
[58] Field of Search .................... 452/1, 12; 206/503, 206/505, 507, 508; 211/49.1, 59.4, 181, 131

[56] References Cited

U.S. PATENT DOCUMENTS

| | | | |
|---|---|---|---|
| 477,134 | 6/1892 | MacQueen | 452/12 |
| 1,200,351 | 10/1916 | Heyser | 452/12 |
| 2,825,466 | 3/1958 | Shnitzler et al. | 211/49.1 |
| 3,157,424 | 11/1964 | Hall | 211/49.1 |
| 4,079,841 | 3/1978 | Castel | 211/131 |
| 4,140,221 | 2/1979 | Garland | 211/181 |
| 4,161,252 | 7/1979 | Howells | 206/508 |
| 4,204,609 | 5/1980 | Kuhn | 206/508 |
| 4,296,866 | 10/1981 | Learnard | 211/131 |
| 4,538,327 | 9/1985 | Einarsson | 452/12 |
| 5,152,407 | 10/1992 | Massoudnia et al. | 211/181 |

*Primary Examiner*—Willis Little
*Attorney, Agent, or Firm*—Seed and Berry

[57] ABSTRACT

Crab sections are held in stacks of nested baskets detachably mounted on opposite sides of a lift tree which is adapted to be hung from an overhead hoist and conveyed from a loading station to processing stations and then to an unloading station. At the loading and unloading stations the lift tree is held vertically on a turntable which is preferably adjustable in height.

26 Claims, 6 Drawing Sheets

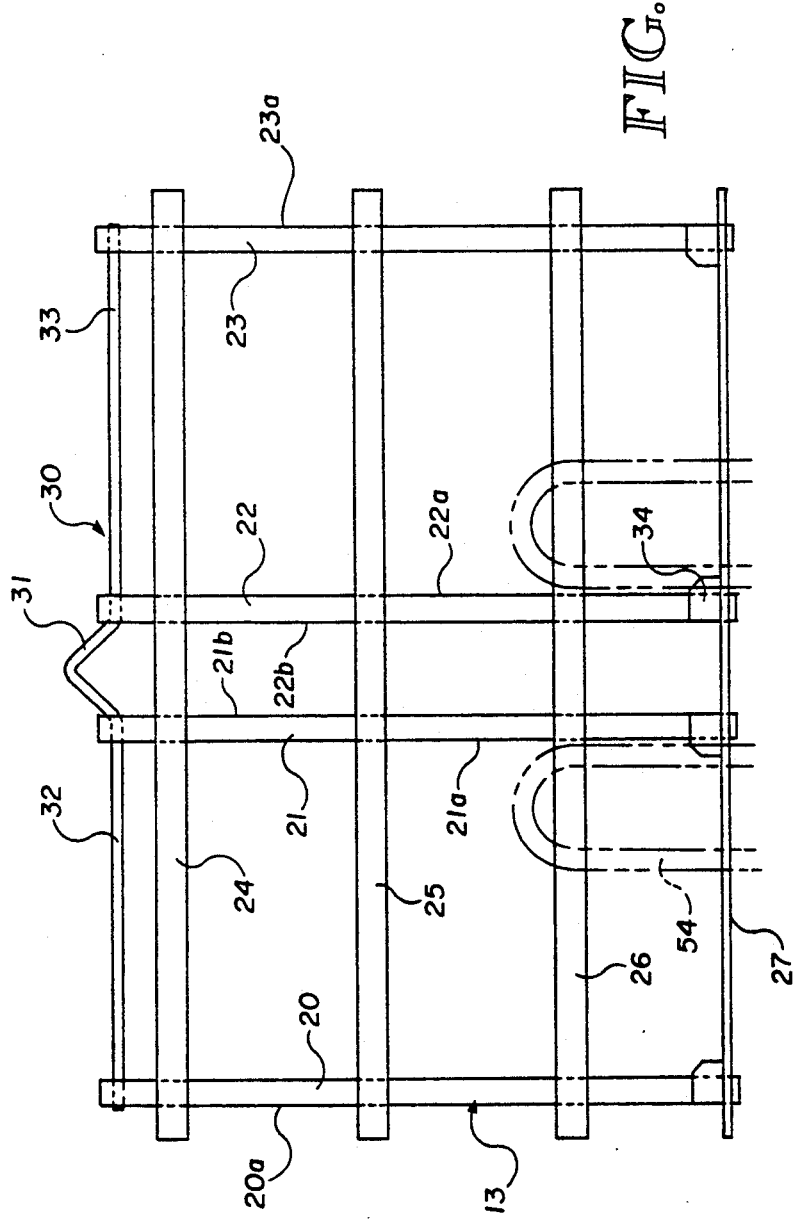
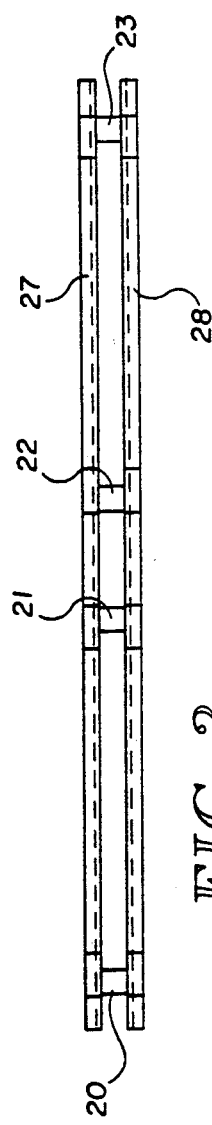

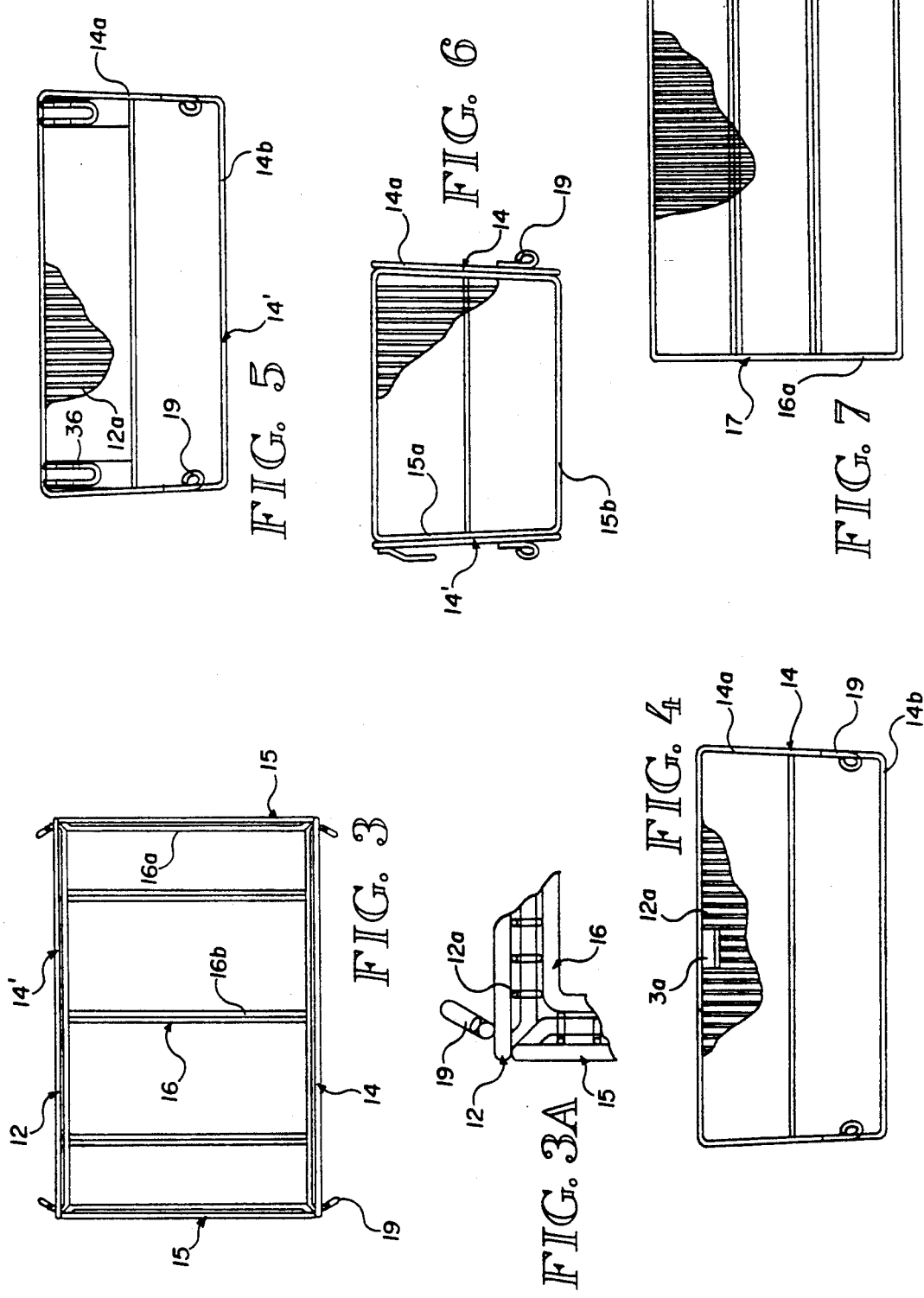

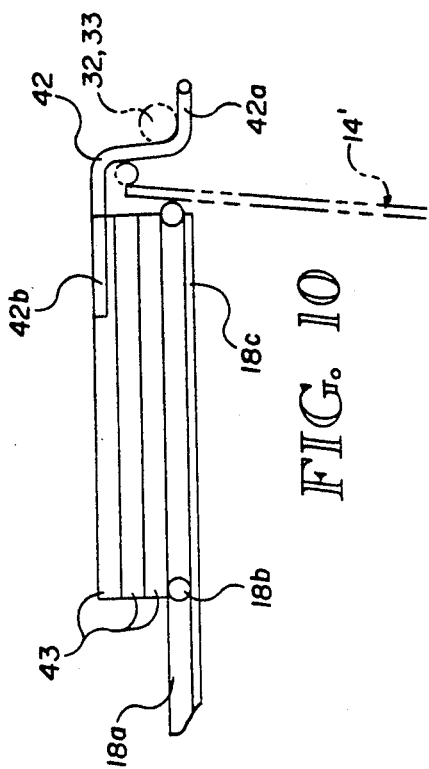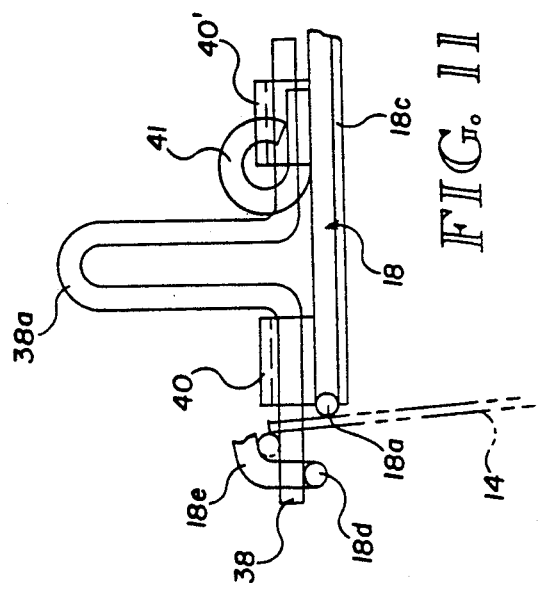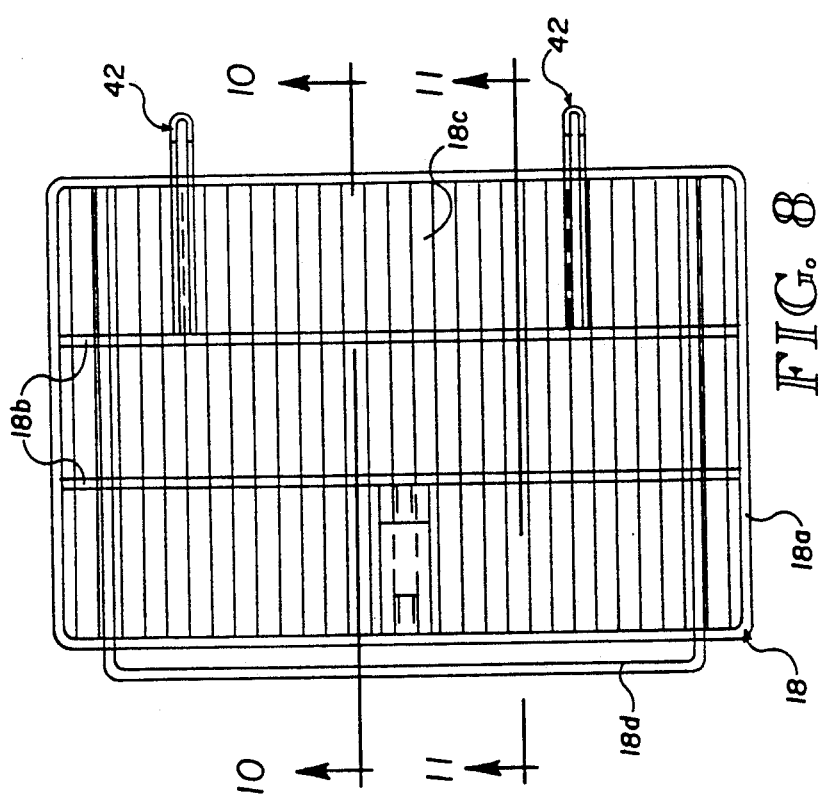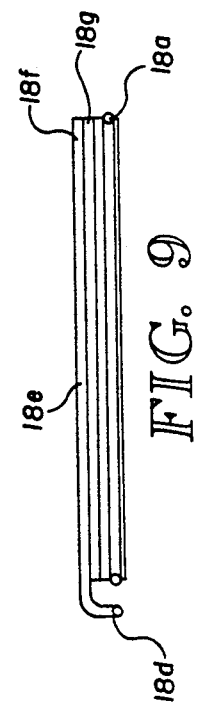

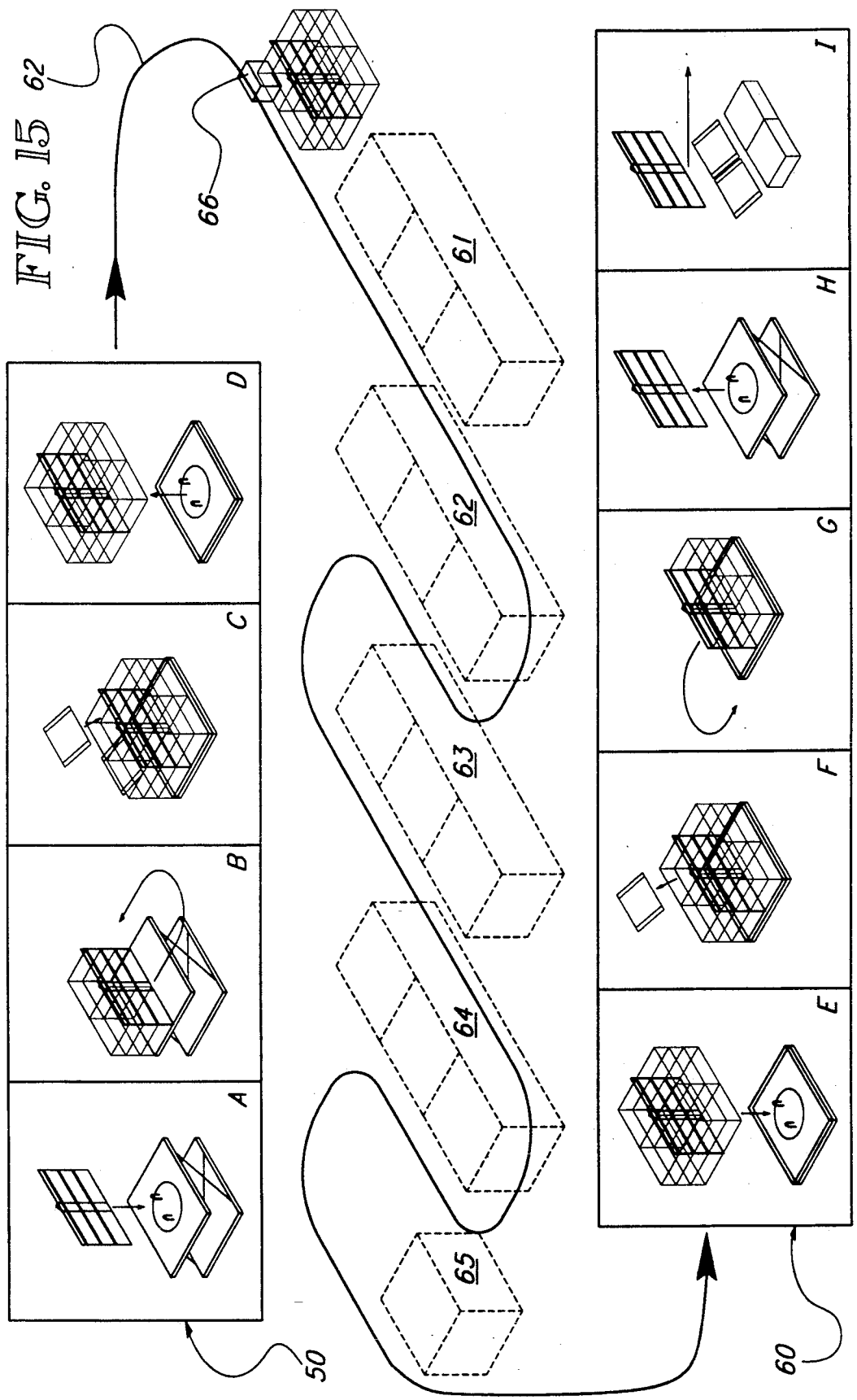

SYSTEM AND APPARATUS FOR PROCESSING CRAB SECTIONS

TECHNICAL FIELD

The present invention relates to the processing of fresh crab sections or the like while held in baskets conveyed to processing stations for cooking and freezing, for example.

BACKGROUND OF THE INVENTION

Commonly, in the processing of fresh crab after it has been cleaned and cut into sections, the crab sections are loaded into heavy-duty galvanized-steel wire-mesh baskets which are then conveyed along an overhead track by carriage-mounted lifting winches to various processing stations for cooking and freezing. The baskets are then unloaded and the frozen modules of crab sections are packed in suitable fibreboard cartons.

The baskets were at one time made with large foldable rectangular sides, and had a wire grid top provided with a lifting eye and pawl type top lock mechanisms, so that when the basket was folded to the upright position and the lid placed on top, a lock-up would be completed. Generally the basket had two interior chambers, separated by a wire grid divider. The basket was generally made to the maximum practical size useable in the customer's processing tanks and became known as a bulk pack basket.

There was no attempt to equalize the weight of product in the bulk pack baskets. The principal focus was to jam as much crab into the baskets and through the processing system as possible. As time went by the bulk type basket was improved to include flow-through dividers, The next step was the introduction of a double stack basket to facilitate handling and packing. This basket retained the same concepts as the bulk pack baskets except that it had added thereto a light angle iron base frame to permit stacking and add strength. This model resulted in the development of a lid lift yoke consisting of a lid whereon there was welded a lift backbone combined with two offset hinged wire arms that stored side-by-side on top of the lid. These arms were arranged to rotate downward 270 degrees and drop over contact pickup arrangements on each individual basket within the stack to lock the baskets as a unit for pickup on the overhead lifting mechanism to convey the stack unit through the processing system.

As time went by crab processors required various shapes and sizes of basket units. Use of horizontal double compartment baskets with flow through dividers began. These were combined with two stack and three stack modules. Then tapered baskets were introduced having all four sides tapered so that the baskets in a stack could be nested, the nesting being limited to a depth of about an inch by cleats on the baskets arranged to engage the upper rim of the next lower basket. Discharge of the frozen product from a tapered basket is usually achieved by either turning the basket over within a fibre carton, or providing the basket with an ejection bottom which comprises a loose grid in the bottom of the basket. The ejection bottom is elevated upward at an unloading station so that the block of frozen product is positioned on the elevated bottom above the top rim of the basket. The packing operator slips an upside-down fibre box over the product block and turns the box upright with the frozen product block inside.

At about the same time that the commercial use of tapered baskets commenced, the market began to require smaller modules of frozen product and more weight control. This in turn created a need to use smaller baskets in the processing system and to be able to increase the number of baskets contained in each processing module, as, for example, twelve baskets arranged in four stacks, without complicating loading and unloading of the baskets. Furthermore, there was a need to make the multi-basket module as compact as possible so that processing tank sizes could be kept to a minimum, and to do so without sacrificing structural strength and basket durability.

SUMMARY OF THE INVENTION

The present invention meets the above discussed needs by mounting stacks of like tapered baskets on opposite sides of a narrow center lift tree having a lift eye at the top. The bottom basket in each stack seats by external cleats on a horizontal support on the tree at the inner side of the basket and each of the baskets in the stack are nested about an inch into the subjacent basket. As previously, this nesting depth is controlled by engagement of external cleats with the rim of the subjacent basket. Each basket is prevented by swinging away from the tree, or sliding horizontally along the tree, by hook elements or the like which engage complementing bars or posts on the lift tree. The top basket in each stack has a lid which nests in the basket the same distance as the baskets are nested with one another, and swings down into closed position from tree engaging elements which together with a locking bolt on the lid keep the lid pressed down in proper position. With the described arrangement the tree and associated stacks of baskets become a stable and durable module which can be lifted and conveyed by engagement of an overhead lift with the eye on the lift tree.

The lift tree is adapted to detachably interfit by vertical motion with upstanding key means on a turntable mounted on a support table, which preferably can be selectively raised and lowered by a lift therebeneath. Such a turntable arrangement is provided at a loading station at which filled baskets are mounted on the lift tree, and at an unloading station at which the baskets are removed from the lift tree and emptied into cartons. When crab sections are being processed, the lift tree and associated baskets are conveyed by an overhead conveyor from the loading station to intermediate processing stations which may comprise a cooker, cooler, chiller, brine freezer, and glaze tank, and then to the unloading station.

BRIEF DESCRIPTION OF THE DRAWINGS

FIG. 1 is a front elevational view of a lift tree in accordance with the present invention;

FIG. 2 is a bottom plan view of the lift tree;

FIG. 3 is a top plan of a basket for mounting on the lift tree and shown with the bottom grid (FIG. 7) removed;

FIG. 3-A is a detail view showing the lower right hand corner portion of the basket as shown in FIG. 3;

FIGS. 4-6 are back, front, and end views, respectively, of the basket;

FIG. 7 is a top plan view of the removable bottom grid for the basket;

FIGS. 8 and 9 are top plan and end views respectively, of a lid for the basket;

FIGS. 10 and 11 are detail transverse vertical sectional views taken as indicated by lines 10—10 and 11—11 in FIG. 8;

FIG. 15 is a schematic view illustrating the system of using the lift tree, baskets, and related devices.

DETAILED DESCRIPTION OF THE INVENTION

Figure 13:
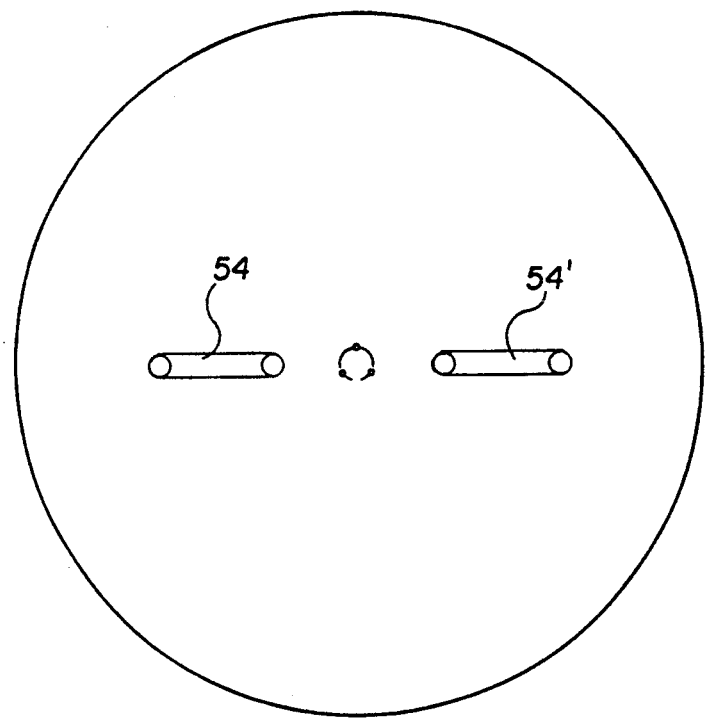
FIG. 13 is a top plan view of the turntable and keys.

The present invention provides a novel basket and lift tree assembly in which stacks of nested baskets 12 are detachably mounted on opposite sides of a central lift tree 13. Each basket 12 is preferably of welded-wire construction and comprises front and back trapezoidal-shaped wire grids 14—14' and a pair of end grids 15—15 welded together at their sloped upright border edges 14a, 15a to form a tapered enclosure, a bottom wire support frame 16, and a removable bottom wire grid 17. Grids 14, 14', 15 and 17 have transverse grid wires which may be spaced apart about 0.625 inches. The bottom frame 16 has a wire border 16a and three pairs of transverse frame wires 16b, and is welded to the bottom edge wires 14b, 15b of the side and end grids. The bottom wire grid 17 seats on the bottom support frame 16 so that it can be pushed upwardly out of the basket to assist in ejecting frozen product from the basket.

Figure 14:
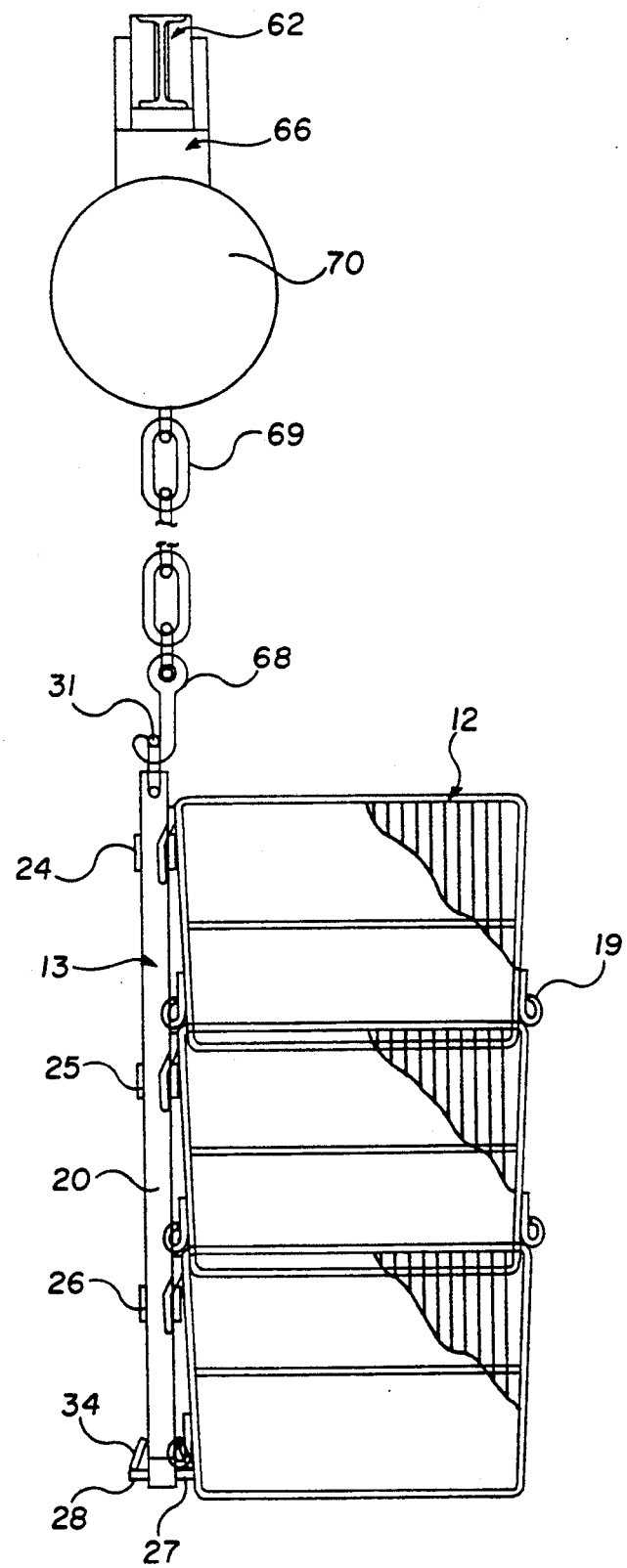
FIG. 14 is an end view of the lift tree with a stack of baskets mounted thereon; and before the lid is applied.

Because of their taper the baskets 12 can nest in stacks as indicated in FIG. 14 so that the bottom of the baskets above the bottom basket in a stack cover the subjacent baskets. The top basket in each stack has a lock-on lid 18 which nests into the top basket to the same extent as the baskets above the bottom basket nest with the subjacent baskets. The extent of the nesting of the baskets is limited by external cleats 19 on the baskets which are preferably located about one inch from the bottom of the baskets and are arranged to engage the top of the rim of the subjacent basket.

As previously discussed, the use of nesting baskets with ejection bottoms and controlled nesting by the use of external cleats has been known in the crab processing art. However, such baskets have not been used together with a central lift tree in the manner to be described.

Directing attention to the lift tree 13, such has a rigid frame comprising four coplanar vertical square tubular frame members 20-23 on opposite sides of which are welded respective sets of three equally-spaced flat horizontal hanger bars 24-26. At the bottom the lift tree frame has two horizontally spaced flat support bars 27-28 each welded at an edge face to the four frame members 20-23, at its upper end the tree frame has a wire wishbone member 30 presenting a central lift eye 31. The two branches of the wishbone member extend horizontally through openings in respective pairs 20-21 and 22-23 of the vertical frame members to function as fulcrum rods 32—32 and are welded in position.

The bottom support bars 27-28 serve as bottom supports for stacks of nested baskets on opposite sides of the lift tree 13, and for this purpose are arranged to be engaged by the adjacent cleats 19 on the bottom baskets in each respective stack. To assist in keeping the top of the bottom baskets in horizontal position the lift tree frame is preferably provided with two sets of sloped ramp plates 34 extending from respective of the frame members 24-26 to the bottom support bars 27-28. Referring to FIG. 14, these ramp plates 34 are arranged to be engaged by the bottom rims of the bottom baskets as they are lowered into position to guide them outwardly relative to the lift tree until the inner pair of the cleats 19 on the bottom baskets are seated on the bottom support bars 27-28 and the adjoining inner sides of the bottom baskets are engaged by the outer edge faces of the bottom support bars 27-28.

As part of the present invention the back grid 14' of the baskets 12 are each provided with a pair of horizontally-spaced wire hook elements 36 arranged to hook over one of the horizontal hanger bars 24-26 to prevent the baskets from swinging outwardly relative to the lift frame 13. In this regard, it is preferred that the hook elements 36 do not seat on the upper edge of the hanger bars 24-26 so that the extent of the nesting of the baskets will be determined solely by the seating of the cleats 19 on the subjacent baskets and by the seating of the cleats on the back grid 14' of the bottom basket on the respective support bar 27-28. The hook elements 36 have a second function, and namely to prevent the baskets from moving laterally relative to the lift frame 13 in the plane of the lift frame. This is accomplished by way of positioning each pair of hook elements 36 so that they collectively straddle a respective pair 20-21 or 22-23 of the vertical frame members. By this arrangement the inner hook element in each pair of hook elements limits outward movement of the basket by engaging the inner side face 21b or 22b of the inner frame member 21 or 22, and the outer hook element in each pair limits inward movement by engagement with the outer side face 20a or 23a of the outer vertical frame member 20 or 23.

Referring to FIGS. 8-11, the basket lid 18 has a bottom rectangular wire grid section having a border frame 18a, a pair of intermediate longitudinal element 18b, and multiple transverse wires 18c. At the front the lid 18 has a handle bar 18d extending between turned-down front portions of a pair of handle supports 18e which traverse the border frame 18a. Each of the handle supports 18e is welded to two respective stacked wire elements 18f, 18g (FIG. 9) the bottom one of which is welded to the pair of longitudinal elements 18b and the border frame 18a.

In accordance with the present invention each basket lid 18 has a latch bolt 38 adjacent an outer side which is arranged to be extended through a front opening 39 in the associated basket to a locking position beneath the top rim of the basket. The bolt 38 is formed with a central U-shaped handle 38a and slides in a pair of aligned retainer sleeves 40, 40' welded to the lid and spaced apart sufficiently to permit limited sliding of the latch bolt 38 between lid latching and releasing positions. The latch bolt 38 is moved forwardly into locking position with its handle 38a upright as shown in FIG. 11. Then the handle 38a is swung down into a horizontal position so that the latch bolt is held in locked position by engagement of the handle with a stop 41 in the form of a loop welded to the rear retainer sleeve 40'.

At its back side, opposite from the latch bolt 38, each lid 18 has a pair of outwardly projecting wire fulcrum elements 42 of generally U-shape. These fulcrum elements each step down to a retainer portion 42a from a mounting portion 42b straddling and welded to the top element of a three layer stack 43 (FIG. 10) of wire segments welded in position. As indicated in FIG. 10, the retainer portion 42b is arranged to project beneath one of the fulcrum rods 32-33 when the lid is tilted upwardly at its outer edge above a respective stack of baskets mounted on the lift tree 13. Then the lid can be swung downwardly with respect to the adjacent fulcrum rod 32 or 33 to nest the lid into the upper basket in the stack. The latch bolt 38 is then extended into its locking position whereat the latch bolt and fulcrum elements 42 function to hold the lid 18 in position covering the upper basket in the respective stack.

Figure 12:
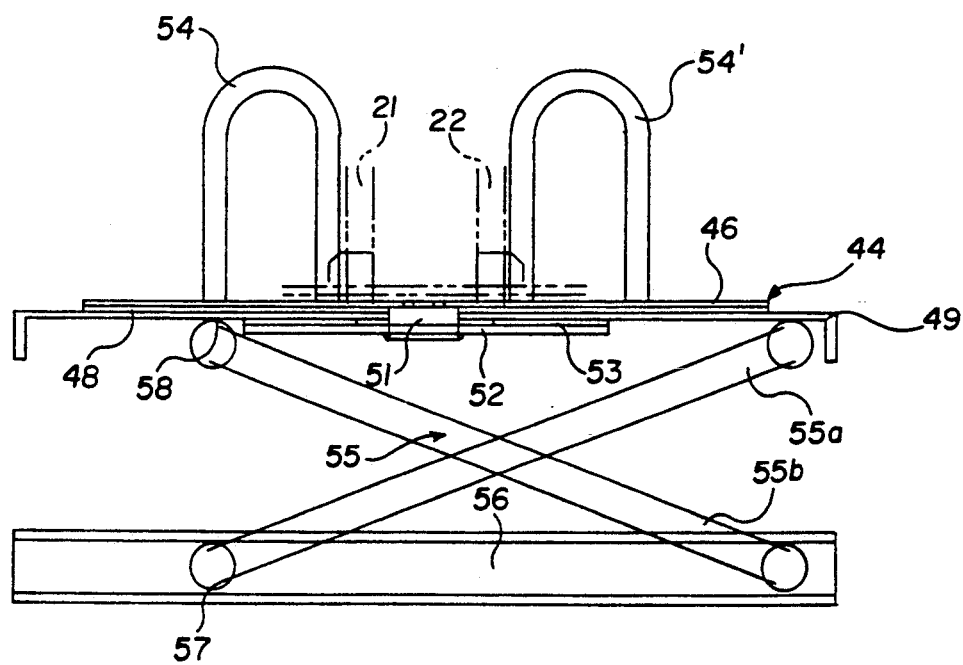
FIG. 12 is a side elevational view showing the turntable and related keys for supporting the lift tree.

Referring to FIGS. 12-13, a turnable holder assembly 44 is provided having a turntable 46 which turns on a base plate 48 of high-density solid lubricant material seated on a support table 49 at a loading station 50. The base plate 48 and support table 49 present a socket receiving a stub shaft 51 projecting downwardly from the turntable 46 to which it is screw connected. At its lower end the stub shaft is welded to a retainer plate 52 positioned beneath a thrust washer 53. The turntable 46 has a pair of upstanding U-shaped keys 54—54' for vertically detachably mounting the lift tree 13 onto the turntable 46 for support when the lift tree is to be loaded with baskets 12 filled with product to be processed. The keys 54—54' are arranged to interfit with the lift tree 13 by fitting into the gaps between the bottom support elements 27-28 and between the bottom hanger elements 26-26 at locations adjacent the outer side faces 21a-22a of the inner vertical frame members 21-22, respectively, of the lift tree when it is lowered onto the turntable 46. The turntable holder arrangement permits the lift tree 13 to be rotated so that opposite sides can be conveniently loaded with baskets from one side of the support table 49.

Preferably the support table 49 is mounted on a powered scissors lift 55 so that it can be raised and lowered at will to a convenient height for loading the baskets onto the lift tree one at a time commencing with the bottom basket for each stack. The scissors lift has one end of its scissor legs 55a, 55b roller-mounted to travel, respectively, on the underside of the support table 49 and in a bottom channel track 56. The opposite ends of the scissor legs 55a, 55b are pivoted at fixed positions 57, 58 relative to the track 56 and support table 49. When each higher basket is to be loaded onto the lift tree the support table 49 is lowered a distance corresponding to the height of a basket by use of the lift 55. The same arrangement of support table 49, turntable assembly 44, and lift 55 is also provided at an unloading station 60.

Directing attention to FIG. 15, an overhead conveyor track 62 extends from the loading station 50 to the unloading station 60 via a series of processing stations. When the product is fresh crab sections to be frozen, these stations normally comprise cooker, cooling, chilling, freezing and glazing units 61-65. In a manner well known in the crab processing art, individual conveyor carriages 66 are suspended from the overhead track 62 and each has a lift hook 68 selectively dropped by a chain 69 from a powered winch 70 to engage the lift eye 31 of one of the lift trees 13 as shown in FIG. 14. When a lift tree is loaded with baskets 12 filled with a preset amount of product to be processed, the loaded lift tree is lifted free of the of the keys 55-56 by taking in the chain 69 supporting the lift hook 68 by operation of the overhead winch. The elevated lift tree 13 is then conveyed beneath the track 62 to the various processing stations 61-65 at which it is lowered and raised as required.

After the processing is completed the loaded lift tree 13 is conveyed to the unloading station 60 and lowered so that it is engaged by the keys 54—54' upstanding from the turntable holder assembly 44 mounted on the support table 49 at the unloading station 60. The lids 18 on the upper baskets of the stacks are then removed after retraction of the latch bolts 40, and the baskets 12 are unloaded successively from the lift tree 13. This unloading operation is assisted by lowering the lift tree in stages by operation of the associated lift 55 so that the loaded baskets can be easily freed from the tree without manual lifting except as necessary to lift the hook elements 36 free of the hanger bars 24-26 on which they are hooked. After each basket is removed from the lift tree the processed product is removed from the basket as a module which is then loaded in a corresponding sized container. For example, in the case of frozen crab sections, the frozen module may be removed from the basket by force lifting the removable bottom section 13 of the basket free of the sides, whereupon an upside-down lined fibreboard carton may be sleeved over the frozen module and turned over. The basket bottom section 13 may then be placed back into the empty basket.

FIG. 15 illustrates in boxes A-D the mounting of the lift tree 14 on the turntable at the loading station 50; turning of the turntable after two stacks of three filled baskets 12 each has been mounted on the lift tree; mounting two additional stacks of baskets and applying the lids for the top baskets; and lifting of the tree and associated baskets from the turntable. Boxes E-I illustrate, respectively, the steps of lowering the lift tree and associated baskets with sections therein onto the keys on the turntable at the unloading station 60 after the crab sections have been cooked, cooled, chilled, frozen and glazed at units 61-67; removing the lids; turning the turntable after the two stacks of baskets on one side have been unloaded; lifting the lift tree from the turntable; and transporting the lift tree, baskets and lids back to the loading station.

It will be appreciated that there are suitable equivalents to the hook elements 36 on the basket and cooperating hanger bars 24-26 on the lift tree engaged by the hook elements. For example, eye elements can be substituted for the hook elements and cooperating post elements can be fixed to the frame of the lift tree to receive the eye elements. These post elements can be mounted, for example, on the bars 24-26. The interfit between the eye elements and post elements not only prevents the baskets from swinging outwardly away from the lift tree, but also prevent the baskets from moving laterally in the plane of the lift tree relative to the lift tree.

It will be appreciated that, although specific embodiments of the invention have been described herein for purposes of illustration, various modifications may be made without departing from the spirit and scope of the invention. Accordingly, the invention is not limited except as by the appended claims.

We claim:

1. A system for processing comestibles such as crab sections, said system comprising:
 a tree having a top lift element,
 a basket-to-tree loading station,
 a basket-from-tree unloading station,
 processing stations between said loading and unloading stations, an overhead track extending above each of said stations, an overhead hoist arranged to travel along said track and having a lifting element adapted to engage said lift element on the tree and be selectively raised and lowered over said stations;

means independent of said hoist for selectively holding said tree in upright position at said loading station and unloading station and permitting the tree to be released by raising the tree relative to said loading and unloading stations;

stacks of like baskets for holding comestibles to be processed at said processing stations, said stacks being detachable mounted on two opposite sides of said tree such that the baskets in each stack can be mounted one at a time on the tree by downward movement while the tree is held upright at said loading station, and such that the baskets in each stack can be removed one at a time from the tree by upward movement while the tree is held upright at said unloading station.

2. A system according to claim 1 in which each of said baskets has a horizontally spaced pair of downwardly facing exterior hooks which hook over portions of said tree.

3. A system according to claim 1 in which each of said baskets is tapered and has an exterior pair of horizontally spaced stops adjacent its bottom, each of the baskets in each said stack above the bottom basket in the respective stack nesting part way into the subjacent basket with its said stops resting on the rim of the subjacent basket.

4. A system according to claim 3 in which said stops on the bottom basket in each said stack rest on portions of said tree.

5. A system according to claim 3 in which each of said baskets have a horizontally spaced pair of downwardly facing exterior hooks which hook over portions of said tree, and in which said stops on the bottom basket in each said stack rest on portions of said tree.

6. A system according to claim 1 in which said means for holding said tree upright permits turning of the tree about a vertical axis on said loading station and unloading station.

7. A system according to claim 1 in which said tree has exposed horizontal bars on said opposite sides and said baskets each have a pair of downwardly facing exterior hooks which hook over respective of said bars.

8. A system according to claim 1 in which the top basket in each stack has a lock-on lid held in part against independent vertical movement by said tree.

9. A tree for holding baskets comprising,
a frame having a top central lift element for receiving a hoisting hook, and having a central bottom keyway for receiving a holder, said eye and keyway being alined on a vertical central axis;

said frame also having at opposite sides, like arrangements of exposed horizontal basket holding bars, said arrangements each being centered relative to said vertical axis.

10. A tree according to claim 9 in which each of said arrangements comprises two like side-by-side sets of mounting bars.

11. A tree according to claim 9 in which each of said arrangements comprises a set of mounting bars having three mounting bars spaced apart a modular distance and a fourth mounting bar spaced below the bottom one of said three mounting bars by a distance less than said modular distance.

12. A lift tree for holding partially nested tapered baskets comprising:
a narrow frame having spaced coplanar vertical frame members and sets of horizontal spaced basket holding bars secured to respective opposite sides of said frame members;

horizontal basket supporting bars at opposite sides of said frame members below said sets and extending further outwardly from the plane occupied by said frame members than do said hanger bars;

horizontal fulcrum rods secured to said frame members above said sets;

and a top lifting element on said frame.

13. A lift tree according to claim 12 in which said lifting element is secured to said fulcrum rods.

14. A lift tree according to claim 12 in which said frame has sloped basket guiding elements adjoining said basket supporting bars.

15. A lift tree according to claim 12 in which said frame has a vertical keyway open at the bottom of the frame for mounting on an upright key provided on a lift tree holder.

16. A lift tree and basket assembly comprising:
a center lift tree having a narrow frame and a lift element at the top of said frame;

stacks of baskets detachably mounted on opposite sides of said frame, and a respective lid unit mounted on the top basket in each stack.

17. An assembly according to claim 16 in which the baskets in each stack are vertically nested part way into the subjacent basket, and in which each said lid unit is nested part way into the respective top basket.

18. An assembly according to claim 17 in which said baskets and lift tree have cooperating hanger elements.

19. An assembly according to claim 16 in which said baskets are vertically interfitted and said lid units detachably engage said frame such as to prevent vertical movement of said stacks relative to said frame until said lid units are removed, and in which the bottom basket in each stack is seated on said frame.

20. An assembly according to claim 19 in which said baskets and frame have cooperating restraining elements preventing horizontal movement of said baskets relative to said frame when said restraining elements are engaged with one another, said restraining elements permitting said baskets to be lifted free of said frame when said lid units are removed.

21. Apparatus for processing comestibles comprising:
a table;

a lift tree means on the lift tree to hold support stacks of baskets at two opposite sides thereof such that the baskets in each stack can be loaded or unloaded by vertical movement thereof relative to the lift tree;

and mounting means for vertically mounting said lift tree on the table such that the lift tree can be removed therefrom by lifting the lift tree relative to the table.

22. Apparatus according to claim 21 in which said table is a turntable so that turning of said turntable permits said stacks to be selectively positioned at a loading or unloading station.

23. Apparatus according to claim 21 in which lift means are provided for selectively raising and lowering said table whereby baskets can be loaded and unloaded with respect to said lift tree at a selected elevation.

24. Apparatus according to claim 21 in which said mounting means comprises an upstanding positioning element on said table slideably interfitting with said lift tree between said two opposite sides.

25. Apparatus according to claim 21 in which two stacks of baskets are mounted on said lift tree at each of said two opposite sides thereof.

26. Apparatus according to claim 21 in which a respective stack of vertically nested tapered baskets is mounted on said lift tree at said two opposite sides thereof, the top basket in each stack having a nested lid latched thereto by a latch on the lid and said top basket interfitting with said lift tree such as to prevent separation of said lid from said lift tree when said lid is latched to the top basket.

* * * * *

UNITED STATES PATENT AND TRADEMARK OFFICE
CERTIFICATE OF CORRECTION

PATENT NO. :     5,299,972

DATED      :     April 5, 1994

INVENTOR(S) :    John T. Heffernan and James D. Orr

It is certified that error appears in the above-identified patent and that said Letters Patent is hereby corrected as shown below:

In column 8, claim 21, line 54, after "hold" and before "support", please insert --and--.

Signed and Sealed this

Eighteenth Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,299,972
DATED : April 5, 1994
INVENTOR(S) : John T. Heffernan and James D. Orr It is certified that error appears in the above-indentified patent and that said Letters Patent is hereby corrected as shown below:

On the title page, item [73], add --Flohr Metal Fabricators, Inc., Seattle, Washington--.

Signed and Sealed this

Fifteenth Day of November, 1994

Attest:

BRUCE LEHMAN

*Attesting Officer*     *Commissioner of Patents and Trademarks*